United States Patent
Lai

(10) Patent No.: US 12,264,755 B2
(45) Date of Patent: Apr. 1, 2025

(54) TIMER APPLICABLE TO VARIOUS TYPES OF FUEL GAS VALVES AND FUEL GAS VALVE INCLUDING SAME

(71) Applicant: HWEI KEH ENTERPRISE CO., LTD., Taichung (TW)

(72) Inventor: Jih-Ching Lai, Taichung (TW)

(73) Assignee: HWEI KEH ENTERPRISE CO., LTD., Taichung (TW)

(*) Notice: Subject to any disclaimer, the term of this patent is extended or adjusted under 35 U.S.C. 154(b) by 67 days.

(21) Appl. No.: 18/335,135

(22) Filed: Jun. 15, 2023

(65) Prior Publication Data
US 2024/0418292 A1 Dec. 19, 2024

(51) Int. Cl.
*F16K 31/48* (2006.01)

(52) U.S. Cl.
CPC ................................ *F16K 31/485* (2013.01)

(58) Field of Classification Search
CPC ............................. F16K 31/48; F16K 31/485
See application file for complete search history.

(56) References Cited

U.S. PATENT DOCUMENTS

| | | | | |
|---|---|---|---|---|
| 2,208,956 A | * | 7/1940 | Allenbaugh | F16K 31/485 200/35 H |
| 2,653,659 A | * | 9/1953 | Bloom | F16K 31/48 137/624.11 |
| 2,713,900 A | * | 7/1955 | Bloom | F16K 31/48 137/624.11 |
| 2,772,067 A | * | 11/1956 | Wilson | F16K 31/48 251/263 |
| 2,778,419 A | * | 1/1957 | Wantz | G04F 3/025 137/624.11 |
| 2,827,119 A | * | 3/1958 | Mueller | F16K 31/485 137/624.11 |
| 2,891,406 A | * | 6/1959 | Stoner | F16K 31/48 74/529 |
| 2,918,088 A | * | 12/1959 | Garner | F16K 11/165 431/60 |
| 2,930,239 A | * | 3/1960 | Mcdowell | F16K 31/485 74/3.52 |
| 2,995,150 A | * | 8/1961 | Engholdt | F16K 31/485 251/74 |
| 3,008,487 A | * | 11/1961 | Fegel | F16K 31/48 251/25 |
| 3,024,812 A | * | 3/1962 | Bydalek | F16K 31/48 251/77 |
| 3,595,273 A | * | 7/1971 | Kolodziej | F16K 31/48 137/614.12 |

(Continued)

*Primary Examiner* — David Colon-Morales
(74) *Attorney, Agent, or Firm* — Leong C. Lei

(57) ABSTRACT

A timer applicable to various types of fuel gas valves and a fuel gas valve including the timer are provided. The timer includes a rotary knob, a gear-set main body, a guide plate including a guide tube, a push axle, and an elastic element. The timer is combinable with a valve body to form a fuel gas valve. With the guide plate including the guide tube in which the push axle is disposed, a push bar of the timer may push the push axle to accurately drive a valve plug assembly arranged in the valve body to open and shut down a flow passage of the valve body between an entry opening and an exit opening. This allows one single timer to be applicable to various types of valve body and a fuel gas valve including the timer enables use of fuel gas in a safe and correctly timing manner.

10 Claims, 10 Drawing Sheets

(56) References Cited

U.S. PATENT DOCUMENTS

| | | | | |
|---|---|---|---|---|
| 3,803,923 | A * | 4/1974 | Hajny | G04F 3/027 968/813 |
| 3,880,190 | A * | 4/1975 | Boss | F16K 21/06 74/3.5 |
| 3,894,557 | A * | 7/1975 | Impett | F16K 31/48 200/38 FA |
| 4,351,360 | A * | 9/1982 | Smyth | A01G 25/165 137/624.22 |
| 6,354,172 | B1 * | 3/2002 | Piacenza | F16K 31/48 74/567 |
| 6,755,213 | B1 * | 6/2004 | Lai | F23N 1/007 137/624.11 |
| 7,117,893 | B1 * | 10/2006 | Krupa | F16K 31/485 137/624.11 |
| 7,252,113 | B2 * | 8/2007 | Jacobs | A01G 25/165 137/624.21 |
| 10,520,108 | B2 * | 12/2019 | Flick | F23N 1/002 |
| 12,085,187 | B1 * | 9/2024 | Lai | F16K 31/485 |

* cited by examiner

TIMER APPLICABLE TO VARIOUS TYPES OF FUEL GAS VALVES AND FUEL GAS VALVE INCLUDING SAME

TECHNICAL FIELD OF THE INVENTION

The present invention relates to a timer for use in fuel gas valves, and more particularly to a timer applicable to various types of fuel gas valves and a fuel gas valve including the timer.

DESCRIPTION OF THE PRIOR ART

Referring to FIGS. 1 and 2, which correspond to FIGS. 4 and 5 of U.S. Pat. No. 6,755,213 (which will be referred to as the prior art hereinafter), the prior art is a previous invention of the present applicant. The prior art provides a fuel gas valve 100 that includes a valve compartment 21 arranged at one side of a flow passage 26 formed between an entry opening 22 and an exit opening 23 of a valve body 20. A gear based timer 10 is arranged in the valve compartment 21. A valve plug assembly 25 is arranged at an opposite side of the flow passage 26. A plastic/rubber seal cap 254, which is deformable, is arranged and fixed between the valve compartment 21 and the flow passage 26. The valve plug assembly 25 has one end adjacent to the timer 10 and an opposite end received in a receiving chamber 272 of a raised tube 271 of a tube plug 27. A valve aperture 24 is arranged in the flow passage 26 of the valve body 20 extending from the entry opening 22 to the exit opening 23. The timer 10 comprises a rotation axle 12, and when the rotation axle 12 is being rotated, a push bar 11 rotatably mounted in the timer 10 is caused to rotate to one side by an angle so as to rotate in a direction toward the valve plug assembly 25 and push the rubber cap 254 and a top end 2511 of a valve plug pillar 251 of the valve plug assembly 25. The valve plug assembly 25 comprises the valve plug pillar 251, a valve plug ring 252 mounted to the valve plug pillar 251, and a spring 253. The spring 253 has an end supported on a bottom surface of the valve plug ring 252, and the spring 253 has an opposite end supported on an internal bottom surface 273 of the tube plug 27, and the spring 253 is also fit to and encompasses an outer circumferential surface of the raised tube 271 in the center of the tube plug 27. The valve plug ring 252 is biased by a spring force of the spring 253 so as to block and close the valve aperture 24 to prevent fuel gas from entering the flow passage 26 of the entry opening 22 to then flow out of the exit opening 23. When the rotation axle 12 is being rotated to start a timing operation, the push bar 11 is driven to push the rubber cap 254 and the top end 2511 of the valve plug pillar 251 to cause the valve plug pillar 251 to move, so as to make the valve plug ring 252 no longer blocking and closing the valve aperture 24, allowing fuel gas to flow from the entry opening 22 to the exit opening 23. The receiving chamber 272 of the raised tube 271 receives a bottom end 2512 of the valve plug pillar 251 to reciprocally move in the receiving chamber 272. Upon completion of the timing operation, the push bar 11 returns to an original position, and by means of the spring force of the spring 253, the valve plug pillar 251 also returns to an original position and thus drives the valve plug ring 252 to block and close the valve aperture 24 again, preventing fuel gas from further flowing out of the exit opening 23.

It is known from the above description that in the prior art, the timer 10, the valve body 20 and the valve plug assembly 25 of the fuel gas valve 100 are used in combination with each other in such a way that the arrangement of positional relationship thereof, the size of the valve body 20, the length and rotation angle of the push bar 11, and the length of the valve plug pillar 251 have to be determined through precise calculation and management in order to allow the timing operation of the fuel gas valve 100 to be carried out in a safe and accurate manner. Consequently, for the known fuel gas valve 100, once the shape or size of the valve body 20 is changed or re-designed, the timer 10 has to be re-designed. This incurs drawbacks of high fabrication cost, reduction of fabrication performance and throughput, and preventing common use of already fabricated timer. Thus, it is desired to provide a timer that is applicable to valve bodies of fuel gas valves of various types.

SUMMARY OF THE INVENTION

In view of the above, the present invention aims to alleviate the deficiency that in the prior art, a timer is only applicable to one type of valve body.

The primary objective of the present invention is that a guide plate that includes a guide tube is arranged at a lateral side of a timer and a push axle that is actable upon by a force to reciprocally move is disposed in the guide tube, such that a push bar of the timer is operable to push the push axle to accurately drive a valve plug assembly inside a valve body to open or shut down fuel gas flowing in the valve body from an entry opening to an exit opening to thereby achieve an effect of one single timer being applicable to various types of valve body.

Another objective of the present invention is that a guide plate that includes a guide tube is arranged at a lateral side of a timer that is mounted in a fuel gas valve and a push axle that is actable upon by a force to reciprocally move is disposed in the guide tube, such that a push bar of the timer is operable to push the push axle to accurately drive a valve plug assembly inside a valve body to open or shut down fuel gas flowing in the valve body from an entry opening to an exit opening, and as such, the fuel gas valve that has a timing function provides people with a way of using fuel gas in a safe and error-free timing manner.

Thus, to achieve the above objectives, the present invention provides a timer that is applicable to various types of fuel gas valves, comprising: a rotary knob, which has an upper end surface that is marked with a closing symbol indicating closing and timing digit symbols respectively indicating different intervals of time counting; a gear-set main body, which is formed of a plurality of inter-meshed gears arranged in an interior thereof, and is provided with a rotation axle, arranged at a center thereof and is also provided, at a bottom thereof, with a cam having a notch, and is further provided, at one lateral side thereof, with a push bar, the rotation axle being linked up with the gears, the rotation axle having a top end that is mounted and fixed to the rotary knob, the rotation axle having a bottom end that is mounted and fixed to the cam, the push bar comprising a prop block linked up with the cam, wherein rotating the rotary knob causes the rotation axle and the cam to rotate simultaneously therewith to start a timing operation, wherein the prop block of the push bar is driven by the cam to drive the push bar to carry out a rotating movement; a guide plate, which is mounted to and fixed to the lateral side of the gear-set main body to face toward the push bar and comprises at least one guide tube, the guide tube being formed, in an interior thereof, with a channel having two opposite ends penetrating to outside, one of the ends of the guide tube facing toward the push bar, an opposite end of the ends of the guide tube being connected to the guide plate; an elastic element, which is arranged between the push bar and the guide plate and has one end supported on the push bar and an opposite end supported on the guide plate, so as to provide an elastic spring force that, after completion of the timing operation, drives the push bar, together with the prop block thereof, back to original positions; and a push axle, which is in the form of a cylinder and comprises a push axle first end and a push axle second end, and is pivotally received in the channel of the guide tube, the push axle first end being in contact engagement with the push bar, and being drivable by a force acting on the push axle first end or the push axle second end to move.

By means of the structure design provided above, two ends of the guide tube of the guide plate may correctly and respectively face toward the push bar and a valve plug assembly of a valve body to thereby guide the push axle as being pushed by the push bar to accurately push the valve plug assembly to open or shut down fuel gas from the entry opening of the valve body to the exit opening, so that the timer according to the present invention is applicable to the valve bodies of fuel gas valves of various types, and the fuel gas valve that includes the timer of the present invention mounted therein may provide people with a way of using fuel gas in a safe and error-free timing manner.

Further, in case that multiple ones of such a guide tube is included, the push axle may be rotatably received in one of the guide tubes at a selected position based or requirement of the valve body, so that the timer according to the present invention, when used in fuel gas valves, exhibits better flexibility for further expansion of application thereof.

Further, if desired, the length of the push axle can be increased or decreased.

DETAILED DESCRIPTION OF THE PREFERRED EMBODIMENT

Figure 1:
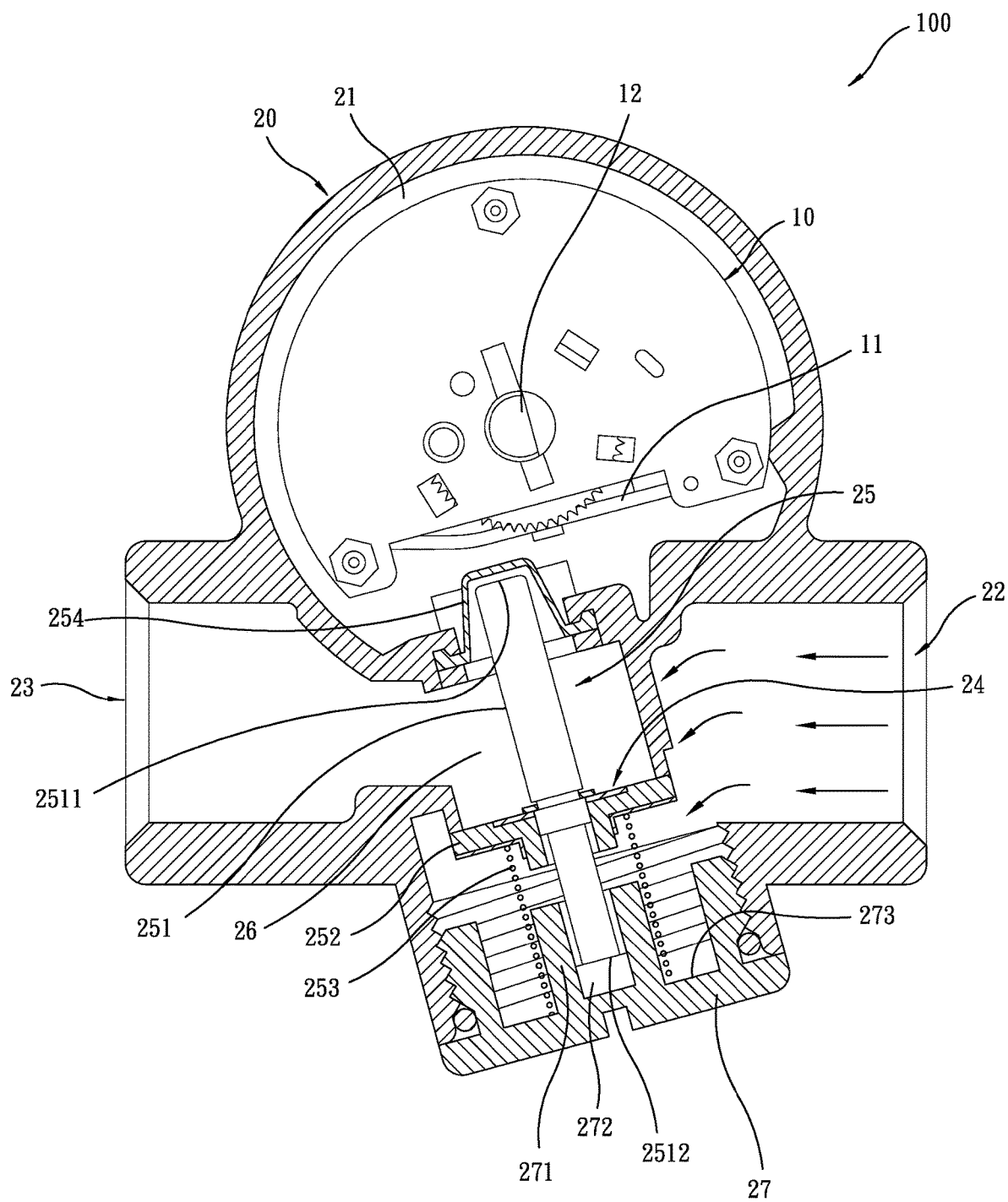
FIGS. 1 and 2 are cross-sectional views showing a prior art fuel gas valve.
Figure 2:
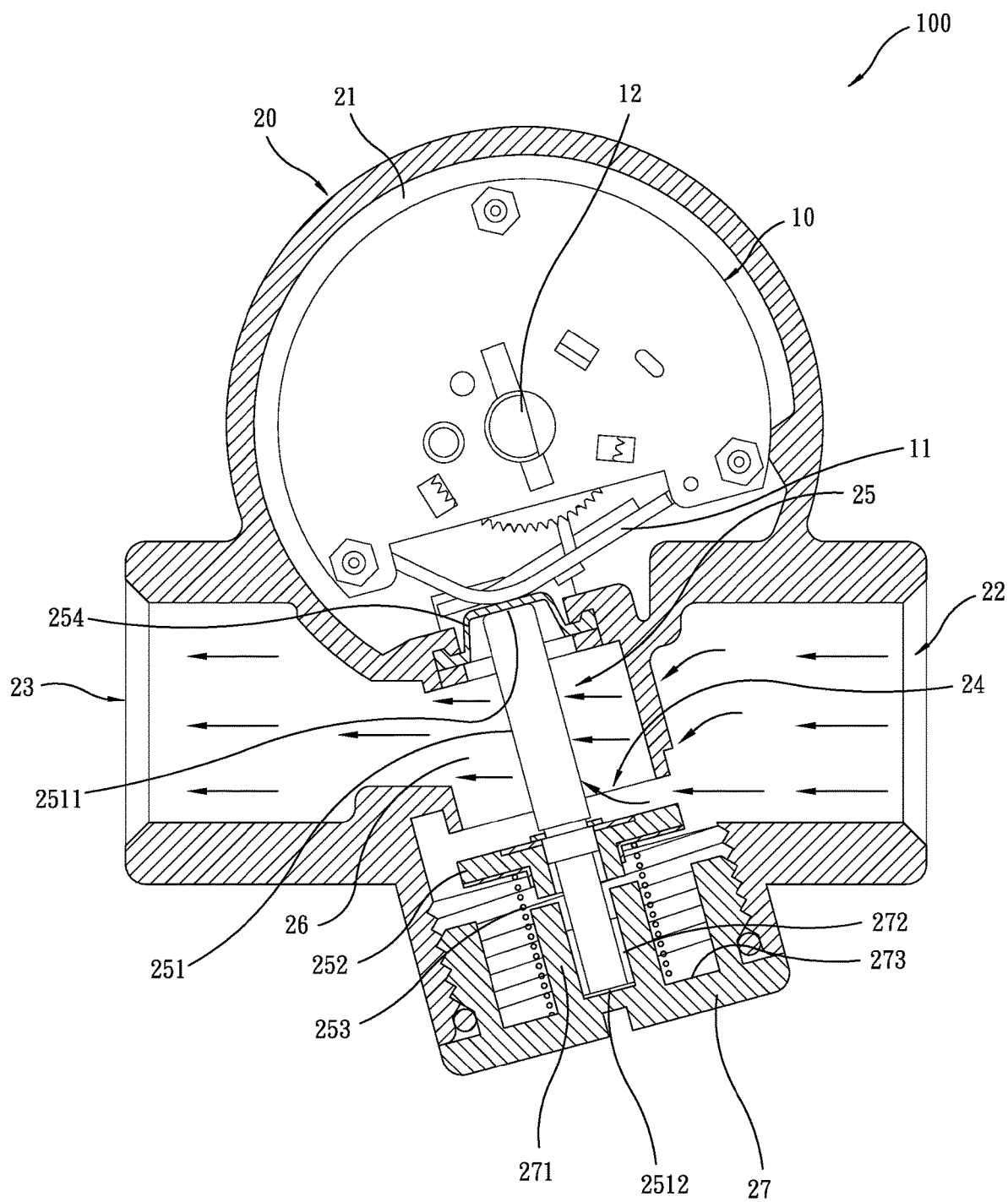
Figure 3:
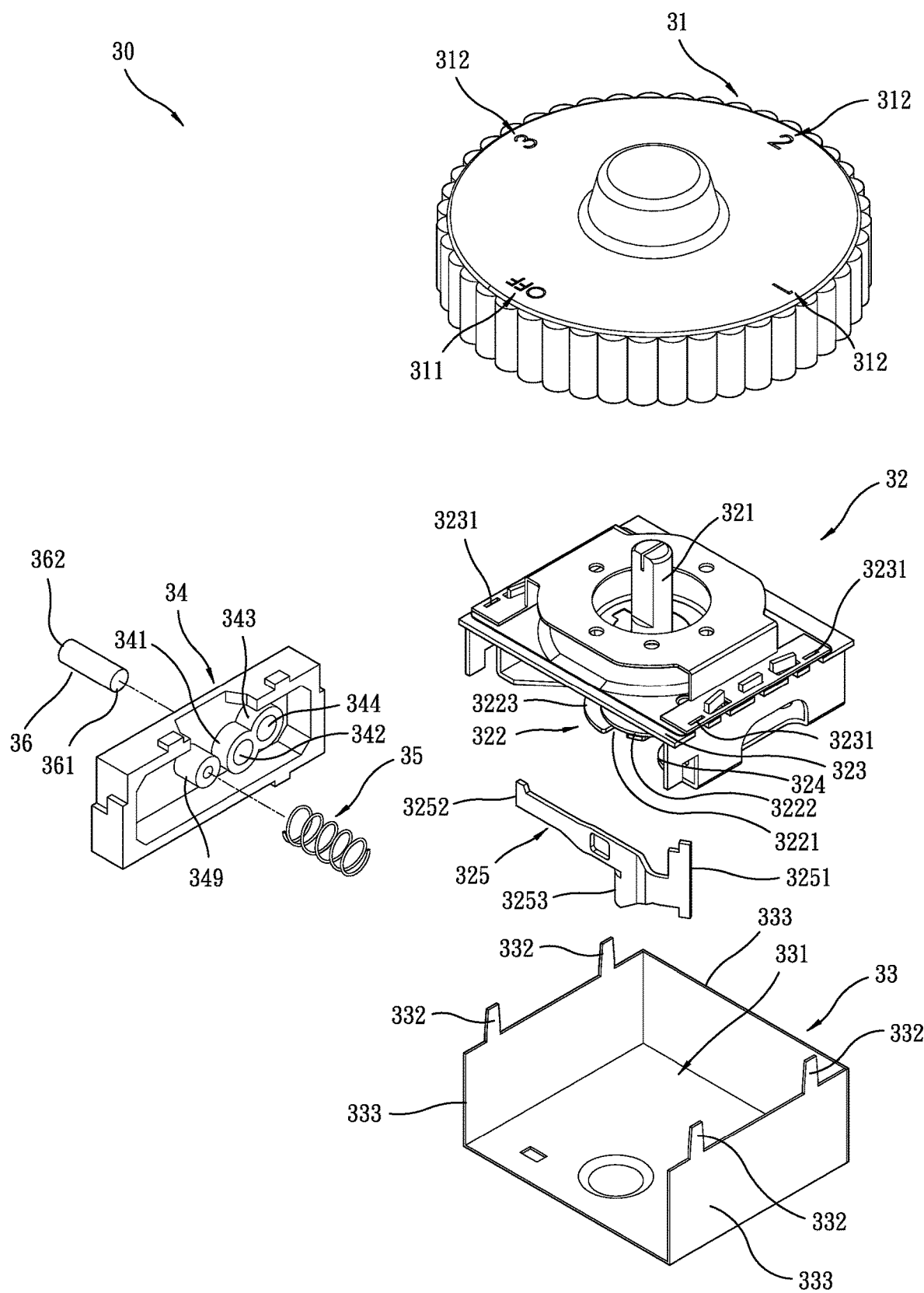
FIG. 3 is an exploded view of a timer according to the present invention.
Figure 4:
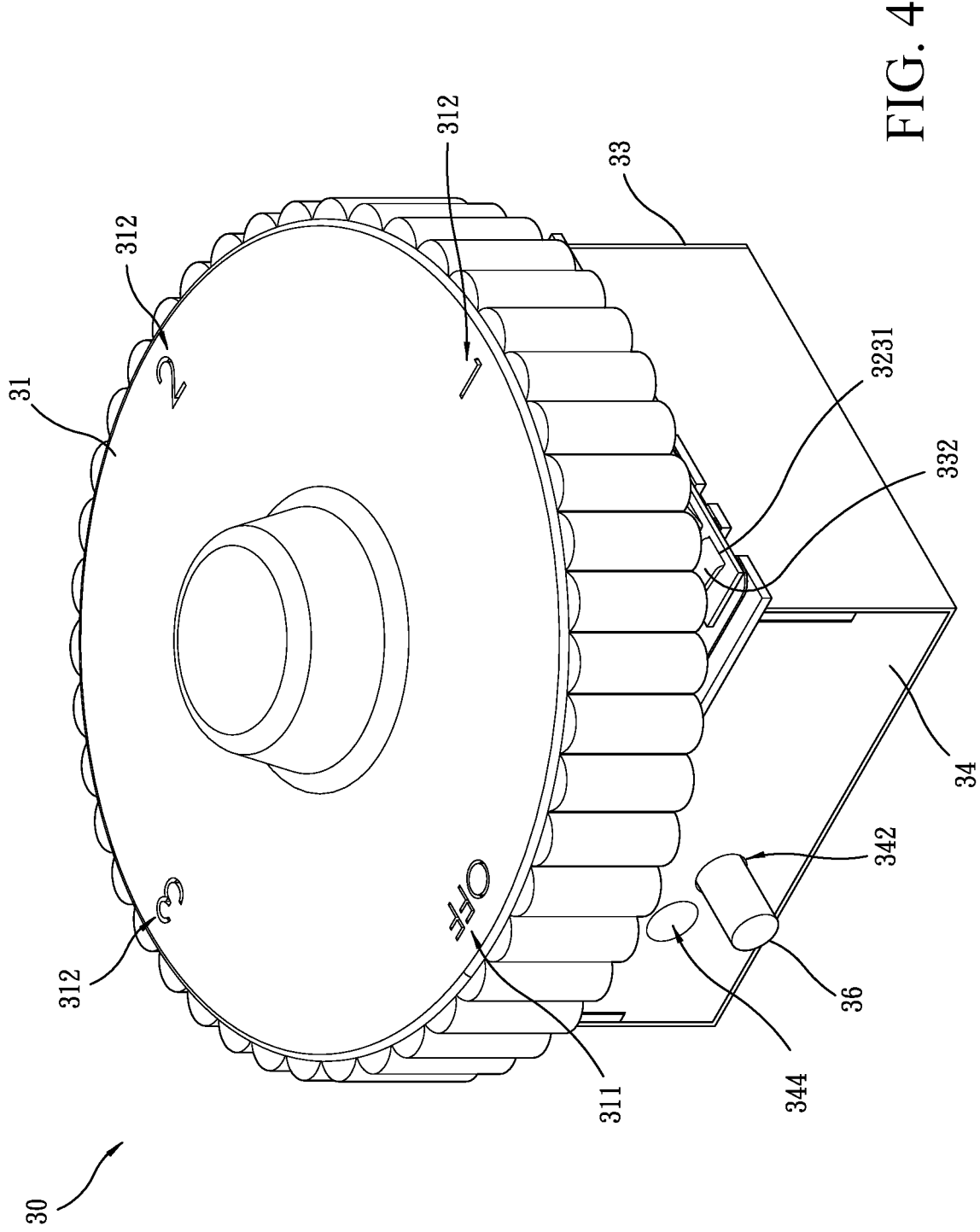
FIG. 4 is a perspective view of the timer according to the present invention in an assembled form.
Figure 5:
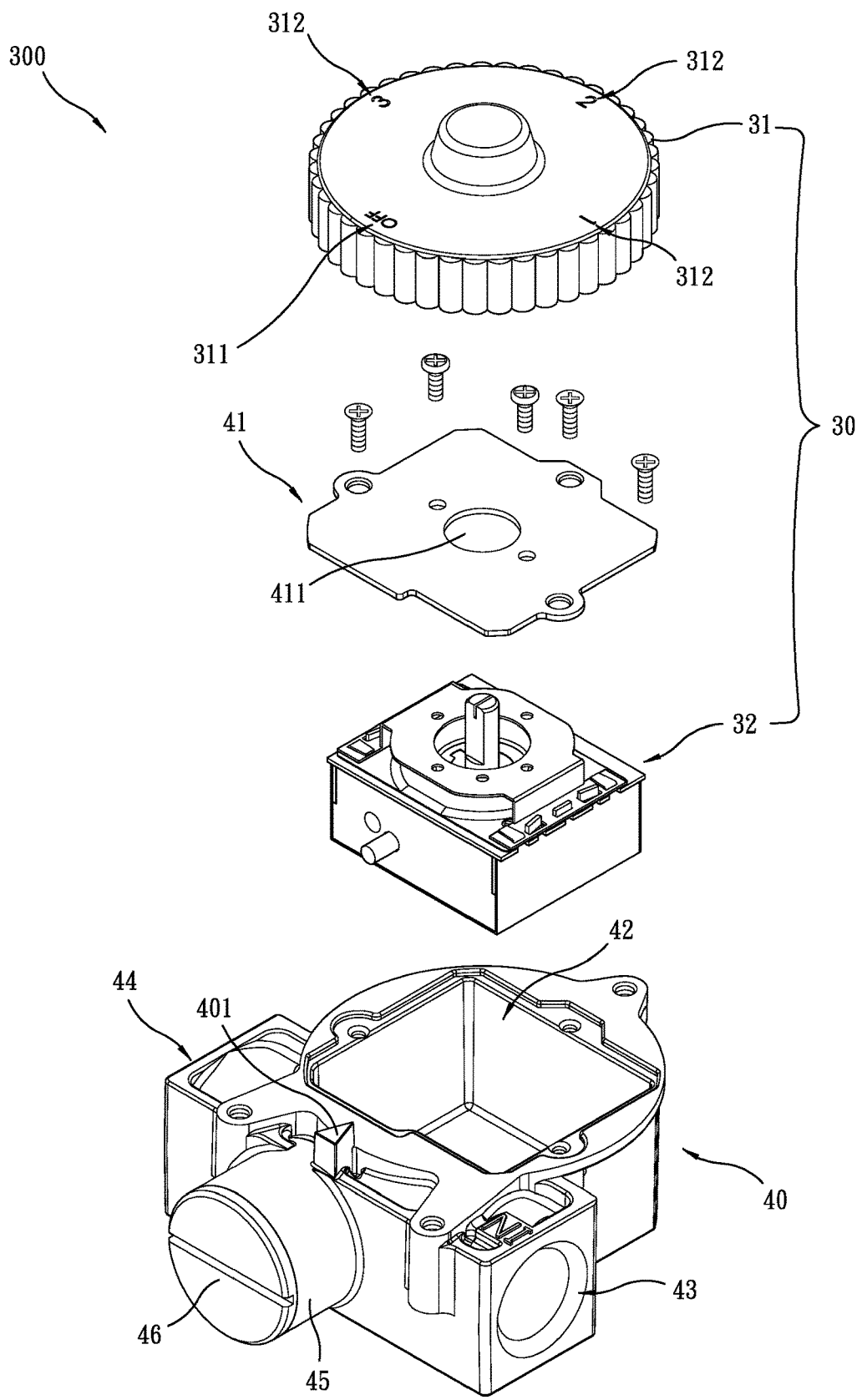
FIG. 5 is an exploded view showing the timer combined with a valve body according to the present invention.
Figure 6:
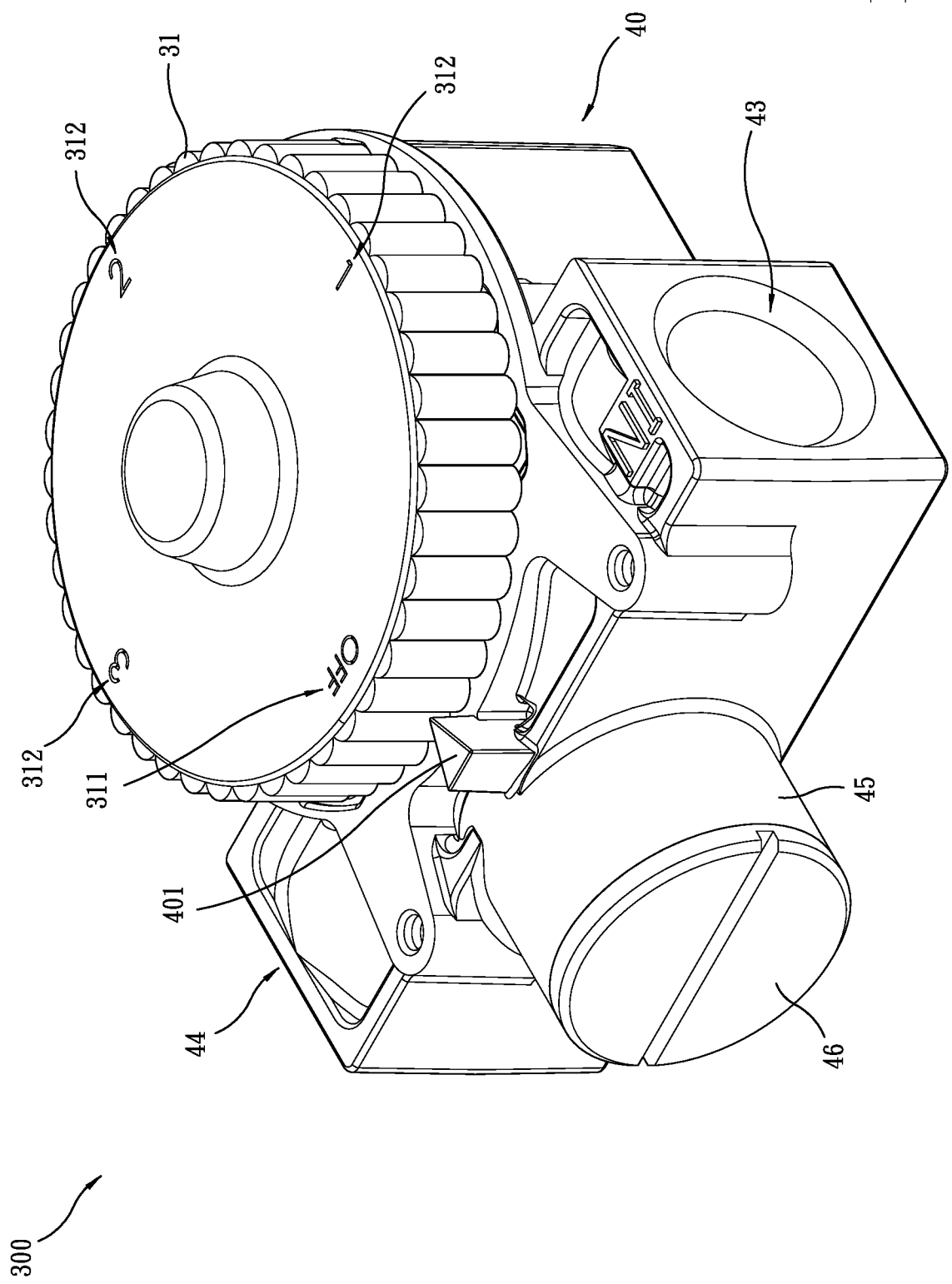
FIG. 6 is a perspective view showing the timer combined with the valve body according to the present invention.

Referring to FIGS. 3 and 4, a timer 30 of an embodiment comprises:

a rotary knob 31, which has an upper end surface that is marked with a closing symbol (OFF) 311 indicating closing and timing digit symbols 312 respectively indicating different intervals of time counting and a bottom that is provided with a D-shaped hole (not shown);

a gear-set main body 32, which is formed of a plurality of inter-meshed gears arranged in an interior thereof, and is provided with a rotation axle 321 arranged at a center thereof and is also provided, at a bottom thereof, with a cam 322 having a notch 3221, and is further provided, at one lateral side thereof, with a push bar 325, wherein the rotation axle 321 is linked up with the interior gears; the rotation axle 321 has a top end that is formed in a D shape for receiving the D-shaped hole in the bottom of the rotary knob 31 to fit thereon and fix thereto, so that when the rotary knob 31 is being rotated the rotation axle 321 is rotated simultaneously therewith; the rotation axle 321 has a bottom end that is connected with and fixed to the notch 3221 the cam 322 has an outer circumference, in which the notch 3221 is formed; a stop 3223 is formed as being raised adjacent to the notch 3221; the push bar 325 has one end that is formed as a pivot end 3251 pivotally connected between an upper board 323 and a bottom board 324 and an opposite end forming a free end 3252 rotatable about a center defined by the pivot end for displacement, and further comprises a prop block 3253 abutting the cam 322 to be linked up with the cam 322, so that when a timing operation is not implemented, the prop block 3253 is received into the notch 3221, and when the rotary knob 31 is being rotated, the rotation axle 321 and the cam 322 are rotated simultaneously start a timing operation, wherein the prop block 3253 of the push bar 325 is driven by the outer circumference 3222 of the cam 322 to climb from the notch 3221 up onto the outer circumference 3222 to force the free end 3252 of the push bar 325 to rotate and displace outward, and the rotary knob 31, the rotation axle 321, and the cam 322 are caused to start rotating in a backward direction, and when the timing operation ends, the rotary knob 31, the rotation axle 321, and the cam 322 are returns to original positions and the prop block 3253 is received into the notch 3221 again;

a guide plate 34, which is assembled to and fixed to the lateral side of the gear-set main body 32 to face toward the push bar 325 and has a back surface that comprises a plurality of guide tubes 341, 343, wherein, in the instant embodiment, two such guide tubes 341, 343 are provided, and each of the guide tubes 341, 343 is formed, in an interior thereof, with a channel 342, 344 that has two opposite ends penetrating to outside; one end of each of the guide tubes 341, 343 is arranged to face the push bar 325, and an opposite end of each of the guide tubes 341, 343 is connected to the guide plate 34; the back surface of the guide plate 34 further comprises a peg 349 arranged thereon;

an elastic element 35, which in the instant embodiment is embodied as a spring having one end supported on the push bar 325 and an opposite end is force-fit onto the peg 349 of the guide plate 34, so as to provide an elastic spring force that, after completion of a timing operation, drives the push bar 325 and the prop block 3253 thereof back to original positions; and a push axle 36, which is in the form of a cylinder and comprises a first end 361 and a second end 362, and is pivotally received in the channel 342 of the first guide tube 341 and has an end contacting the push bar 325, and is drivable to move when a force is applied to the first end 361 or the second end 362, wherein a length of the push axle 36 can be extended or reduced as desired.

A base 33 comprises a receiving space 331 to receive the gear-set main body 32 to arrange therein and has a wall 333 raised upward from each of three sides thereof, while no wall arranged at a side corresponding to the guide plate 34. Two opposite ones of the walls 333 are each formed with a plurality of spaced protruding plates 332, and each of the protruding plates 332 is extended upward to penetrate through a through opening 3231 formed in the gear-set main body 32 and corresponding thereto, such that the protruding plates 332 can be folded flat to have the gear-set main body 32 and the base 33 securely fixed together (as shown in FIG. 4).

Thus, the above provide a description of components/parts of a timer applicable to various types of fuel gas valves according to a preferred embodiment of the present invention, and assembling thereof, and in the following, assembling thereof with a valve body 40 to form a fuel gas valve 300, and a structure of the valve body 40, will be described as follows:

Referring to FIGS. 5-8, the valve body 40 has an upper end surface that comprises an indicating block 401, and is provided, at one side thereof, with a valve compartment 42 that is open in an upward direction. The valve compartment 42 receives the timer 30 therein. The valve compartment 42 is arranged adjacent to a flow passage 47 with a passage opening 421 formed therebetween. The flow passage 47 has one end forming an entry opening 43 and an opposite end forming an exit opening 44. The flow passage 47 is further provided with a valve aperture 48 between the entry opening 43 and the exit opening 44. A branch tube 45 is arranged at an opposite side of the flow passage 47 and facing the valve compartment 42. A tube plug 46 that is provided, in an interior thereof, with a raised tube 461 is arranged in the branch tube 45 to close and seal the branch tube 45. A valve plug assembly 49 is arranged in the tube plug 46 to open/close the valve aperture 48. The valve plug assembly 49 includes a plastic/rubber seal cap 492, a valve plug pillar 491, a valve plug ring 493, and a spring 494. The plastic/rubber seal cap 492 is mounted in the passage opening 421 and between the valve compartment 42 and the flow passage 47. A valve plug pillar top end 4911 abuts against the plastic/rubber seal cap 492, and a valve plug pillar bottom end 4912 is inserted into a receiving chamber 462 of the raised tube 461. The valve plug ring 493 is fixed on the valve plug pillar 491, and the spring 494 has an end supported on a bottom surface of the valve plug ring 493 and an opposite end fit to an outer circumferential surface of the raised tube 461 and supported on the tube-plug internal bottom surface 463. Further referring to FIGS. 5-8, the timer 30 is first combined with and mounted to a valve cover plate 41. The valve cover plate 41 is formed, in a center thereof, with a through opening 411 that receives the rotation axle 321 of the timer 30 to extend therethrough. The valve cover plate 41 is then combined with and mounted to the upper end surface of the valve body 40 to complete assembling of the timer 30 and the valve body 40 to thereby form a fuel gas valve 300.

Figure 7:
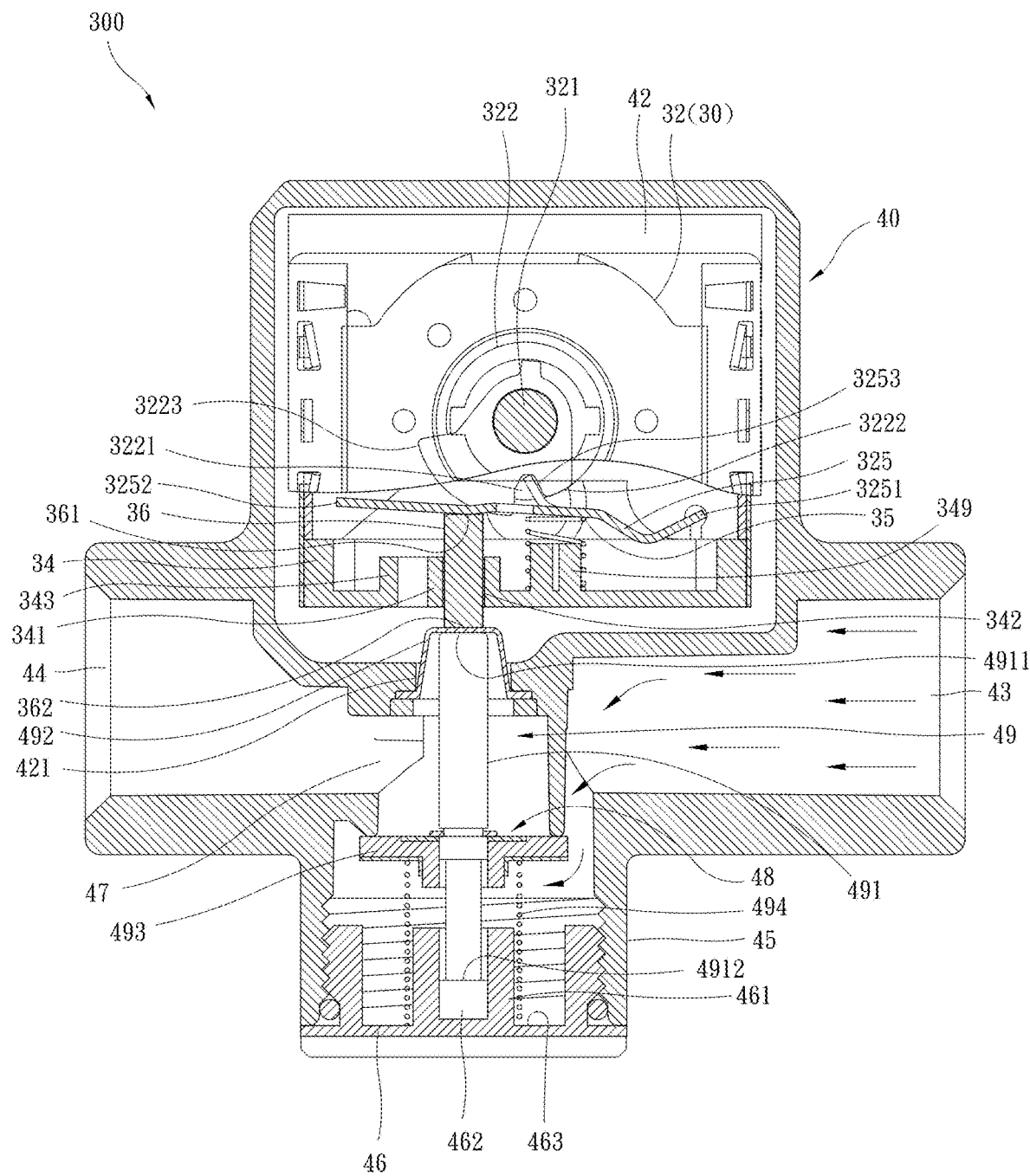
FIGS. 7 and 8 are cross-sectional views illustrating operation of the timer according to the present invention applied to a valve body of a first type.
Figure 8:
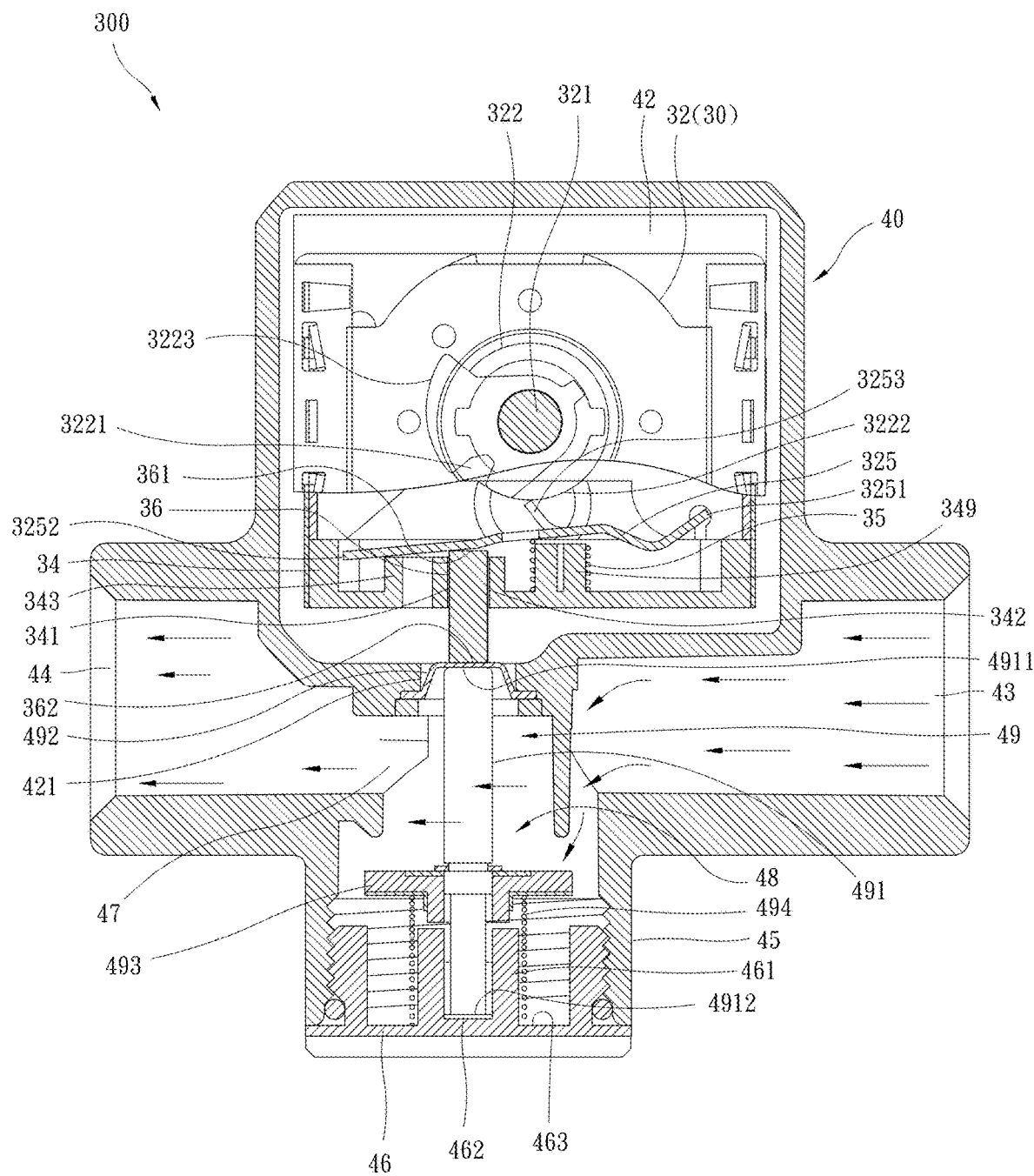

Further referring to FIGS. 7 and 8, advantages and efficacy achieved with the timer 30 and the fuel gas valve 300 of the instant embodiment of the present invention will be described below:

In the embodiment, based on a type of the valve body 40 to which the timer 30 of the instant embodiment is mounted, the push axle 36 is selectively set in the first guide tube 341 or the second guide tube 343 for operation. As shown in FIG. 7, the push axle 36 is rotatably received in the first guide tube 341. When the closing symbol 311 of the rotary knob 31 is set in alignment with the indicating block 401, indicating, under this condition, the valve aperture 48 is closed by the valve plug ring 493, fuel gas is not allowed to enter through the entry opening 43 to then flow out of the exit opening 44, and the prop block 3253 of the push bar 325 is received in the notch 3221 of the cam 322, and the push axle first end 361 is positioned against the push bar 325 and the push axle second end 362 is in light contact with the plastic/rubber seal cap 492, so that when the rotary knob 31 is rotated to have the timing digit symbols 312 aligned with the indicating block 401 to start a timing operation, the rotation axle 321 and the cam 322 are also driven and rotated, and the prop block 3253 is forced to raise to the outer circumference 3222 of the cam 322 to cause the push bar 325 to rotate and displace outwards thereby driving the plastic/rubber seal cap 492, the valve plug pillar 491, and the valve plug ring 493 to move so that fuel gas is allowed to pass through the valve aperture 48 to get into the flow passage 47 and then flow out of the exit opening 44 for user, and when the timing operation ends, namely the rotary knob 31, the rotation axle 321, the cam 322 are rotated backward to return the original positions, the prop block 3253 is again received into the notch 3221, and the elastic element 35 biases the push bar 325 back to the original position and the spring 494 drives, by means of the spring force thereof, the valve plug ring 493, the valve plug pillar 491, the plastic/rubber seal cap 492, and the push axle 36 back to original positions, and thus, the valve plug ring 493 re-closes the valve aperture 48 to prevent fuel gas from passing therethrough, and as such, use of fuel gas in a safe and error-free timing manner can be achieved.

Figure 9:
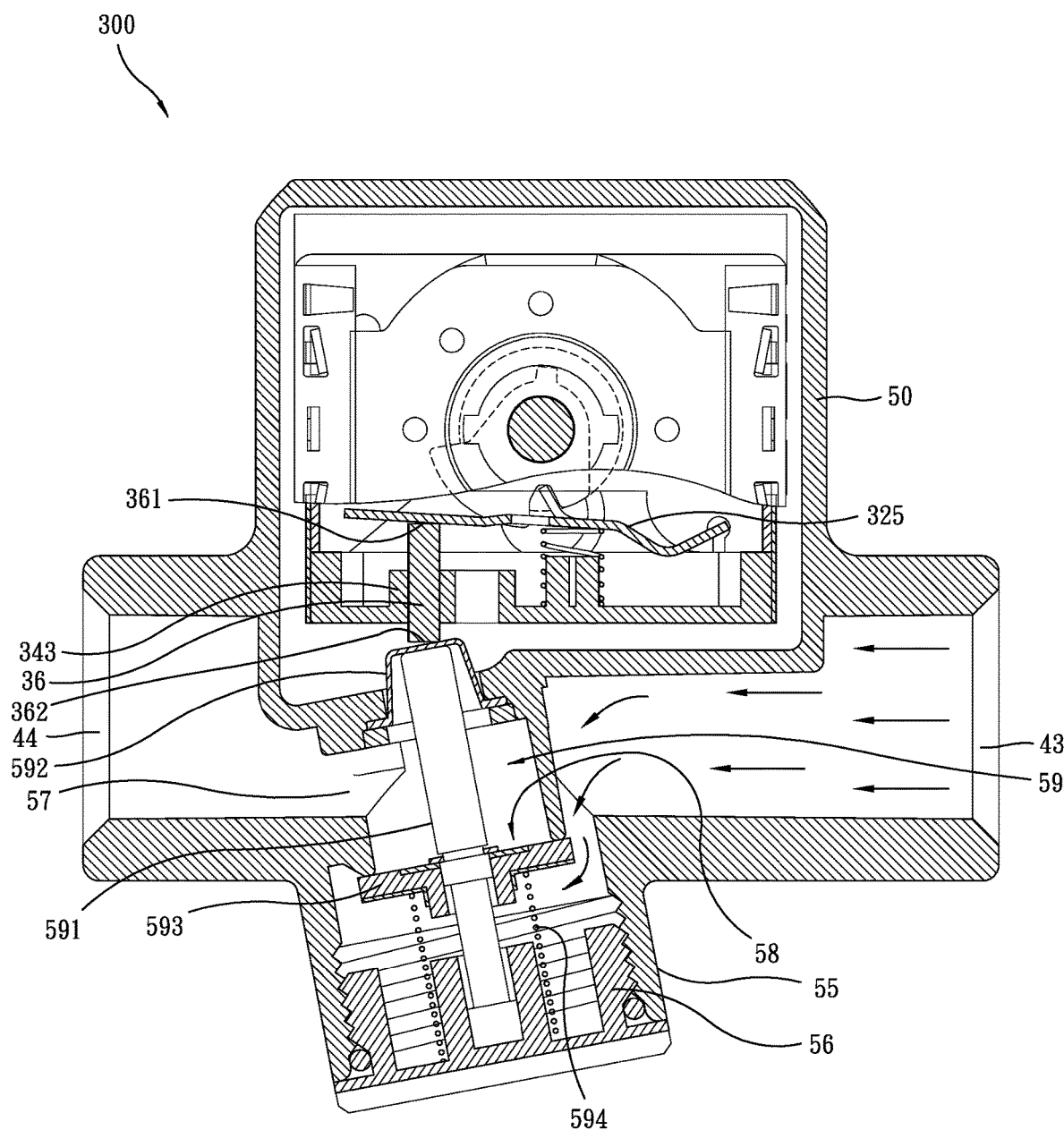
FIGS. 9 and 10 are cross-sectional views illustrating operation of the timer according to the present invention applied to a valve body of a first type.
Figure 10:
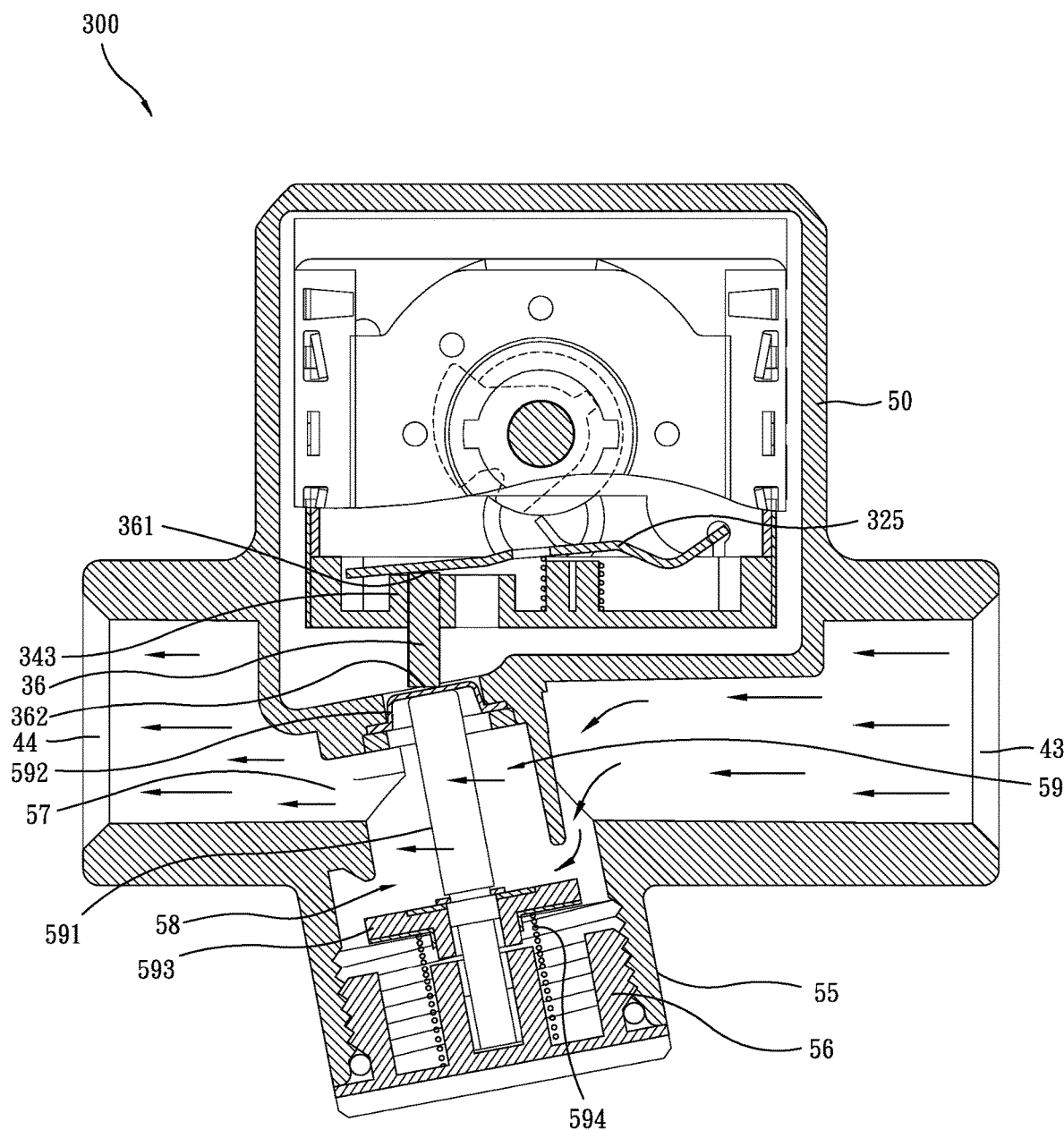

Further referring to FIGS. 9 and 10, in the embodiment, the timer 30 is used in combination with a valve body 50 of another type. In the valve body 50, components, including the branch tube 55, the tube plug 56, and the valve plug assembly 59, are arranged in an oblique form, and the push axle 36 is received in the second guide tube 343, and the push axle the first end 361 is similarly positioned against the push bar 325, and the push axle second end 362 is similarly in light contact with the plastic/rubber seal cap 592, so that when the rotary knob 31 is rotated to start a timing operation, the push bar 325 similarly moves the push axle 36, the plastic/rubber seal cap 592 and the valve plug pillar 591, and the valve plug ring 593 to displace to thereby open the valve aperture 58 to allow fuel gas to enter through the entry opening 53 and get into the flow passage 57 to then flow out of the exit opening 54, and when the timing operation ends, the above-discussed components all return to original positions to thereby re-close the valve aperture 58 to prevent fuel gas from passing through the valve aperture 58, and as such, similarly, use of fuel gas in a safe and error-free timing manner can be achieved.

As described above, the timer according to the instant embodiment is structured such that by means of the guide plate on which the guide tubes are arranged and the push axle received in the guide tubes, the push bar of the timer is operable to push the push axle to thereby accurately and precisely drive the valve plug assembly inside the valve body to open and/or shut fuel gas flowing from the entry opening of the valve body to the exit opening, and as such, an effect that one single timer is applicable to valve bodies of various types can be realized.

I claim:

1. A timer applicable to a first fuel gas valve of a plurality of differently shaped fuel gas valves, comprising:
a rotary knob, which has an upper end surface that is marked with a closing symbol indicating closing and timing digit symbols respectively indicating different intervals of time counting;
a gear-set main body, which is formed of a plurality of inter-meshed gears arranged in an interior thereof, and is provided with a rotation axle, arranged at a center thereof and is also provided, at a bottom thereof, with a cam having a notch, and is further provided, at one lateral side thereof, with a push bar, the rotation axle being linked up with the gears, the rotation axle having a top end that is mounted and fixed to the rotary knob, the rotation axle having a bottom end that is mounted and fixed to the cam, the push bar comprising a prop block linked up with the cam, wherein rotating the rotary knob causes the rotation axle and the cam to rotate simultaneously therewith to start a timing operation, wherein the prop block of the push bar is driven by the cam to drive the push bar to carry out a rotating movement;

a guide plate, which is mounted to and fixed to the lateral side of the gear-set main body to face toward the push bar and comprises at least one guide tube, the guide tube being formed, in an interior thereof, with a channel having two opposite ends penetrating to outside of the guide plate, one of the ends of the guide tube facing toward the push bar, an opposite end of the ends of the guide tube being connected to the guide plate;

an elastic element, which is arranged between the push bar and the guide plate and has one end supported on the push bar and an opposite end supported on the guide plate, so as to provide an elastic spring force that, after completion of the timing operation, drives the push bar, together with the prop block thereof, back to their original positions; and a push axle, which is in the form of a cylinder and comprises a push axle first end and a push axle second end, and is pivotally received in the channel of the guide tube, the push axle first end being in contact engagement with the push bar, and being drivable by a force acting on the push axle first end or the push axle second end to move.

2. The timer according to claim 1, wherein the at least one guide tube comprises a plurality of guide tubes.

3. The timer according to claim 1, further comprising a base, wherein the base is formed with a receiving space in which the gear-set main body is received to be fixed together.

4. The timer according to claim 1, wherein the elastic element comprises a spring, and the guide plate includes a peg arranged thereon, the elastic element being fit to the peg.

5. The first fuel gas valve of the plurality of differently shaped fuel gas valves, comprising the timer according to claim 1, wherein the first fuel gas valve comprises a valve body, the valve body wherein the fuel gas valve comprises a valve body, the valve body comprises an indicating block and is provided, at one side thereof, with a valve compartment, the valve compartment receiving the timer therein, the valve body further comprising a flow passage that is arranged adjacent to the valve compartment, with a passage opening formed therebetween, the flow passage having one end forming an entry opening and an opposite end forming an exit opening, a valve aperture being formed in the flow passage between the entry opening and the exit opening, the valve aperture being openably closable by an elastically and reciprocally movable valve plug assembly;

a top end of the push axle first end is supported on the push bar, and the push axle second end is supported on the valve plug assembly, wherein when the rotary knob is rotated to start the timing operation, the push bar drives the push axle and the valve plug assembly to move to open the valve aperture, and upon completion of the timing operation, the elastic element drives the push bar to return to the original position, and the valve plug assembly is caused by a spring force thereof to return to an original position of the valve to close the valve aperture and also to drive the push axle back to its original position.

6. The first fuel gas valve according to claim 5, wherein the valve body further comprises a valve cover plate, the timer being mounted to and fixed to a bottom surface of the valve cover plate, the valve cover plate being mounted to and fixed to the valve body, the valve cover plate being formed with a through opening in a center thereof to receive the rotation axle to extend therethrough.

7. The first fuel gas valve according to claim 5, wherein a branch tube is arranged at an opposite side the flow passage and facing the valve compartment, and a tube plug that is provided, in an interior thereof, with a raised tube is arranged in the branch tube to close and seal the branch tube, the valve plug assembly comprising a plastic/rubber seal cap, a valve plug pillar, a valve plug ring, and a spring, the plastic/rubber seal cap being mounted in the passage opening and between the valve compartment and the flow passage, a top end of the valve plug pillar abutting against the plastic/rubber seal cap, a bottom end of the valve plug pillar being inserted into the raised tube, the valve plug ring being fixed on the valve plug pillar, the spring having an end supported on a bottom surface of the valve plug ring and an opposite end fit to an outer circumferential surface of the raised tube and supported on a tube-plug internal bottom surface, the valve aperture being openably closable by the valve plug ring.

8. The first fuel gas valve according to claim 5, wherein the at least one guide tube comprises a plurality of guide tubes.

9. The first fuel gas valve according to claim 5, further comprising a base, wherein the base is formed with a receiving space in which the gear-set main body is received to be fixed together.

10. The first fuel gas valve according to claim 5, wherein the elastic element comprises a spring, and the guide plate includes a peg arranged thereon, the elastic element being fit to the peg.

* * * * *